A. W. TORKINGTON.
TIRE.
APPLICATION FILED JUNE 20, 1913.
1,222,906.
Patented Apr. 17, 1917.
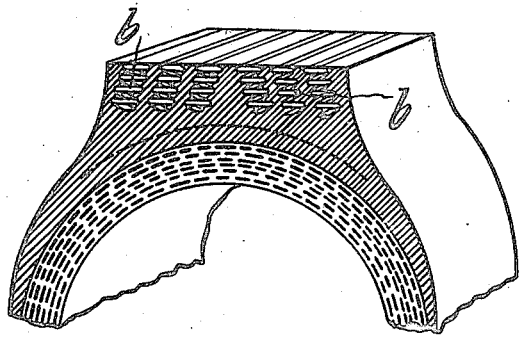

UNITED STATES PATENT OFFICE.

ALFRED WILLIAM TORKINGTON, OF LONDON, ENGLAND.

TIRE.

1,222,906.      Specification of Letters Patent.      Patented Apr. 17, 1917.

Application filed June 20, 1913. Serial No. 774,869.

*To all whom it may concern:*

Be it known that I, ALFRED WILLIAM TORKINGTON, a citizen of Great Britain, residing at 11 Queen Victoria street, London, England, engineer, have invented new and useful Improvements in or Relating to Tires; and I do hereby declare the following to be a full, clear, and exact description of the same.

This invention comprises improvements in or relating to tires and in the manufacture of the same, and relates to tires in which metallic reinforcing material is employed in combination with rubber to prevent *inter alia* punctures, cutting of the tires by sharp stones and other objects encountered on road surfaces and side slipping or skidding, and also to increase the durability of the tire or cover. Examples of such reinforced tires or tire covers are set forth in the application of Alfred Edmund Wale, which has been serially numbered 607772.

The invention comprises arrangements of metallic reinforcement in the rubber or like material of the tire or tire cover in which the component helices are disposed at an inclination to the true radial position with respect to the finished article. This has the effect of increasing the flexibility of the reinforced material and also increases the powers of resisting punctures and may facilitate manufacture.

On the drawing:

The figure is a cross sectional view of a tread showing the preferred arrangement of the reinforcement in which the strips are bodily inclined.

In accordance with my invention I use interwoven helical wire fabric in combination with rubber. I cut the fabric into strips and when a number of these strips are assembled or a long strip is mounted or incorporated in edgewise condition as part of a tire or tire cover the component helices will be disposed at an inclination to the true radial position. I may obtain this effect by mounting the strips themselves at any suitable inclination in forming the tire or tire cover. The figure shows the strips arranged longitudinally of the tire in two parallel series and some inclined one way and the others oppositely toward the central plane of the tire.

It will be understood that to obtain an efficient reinforcement of the rubber it is desirable that the rubber should be pressed or otherwise caused to enter all the interstices of the fabric, and while I do not limit myself to any particular way of obtaining the combination of the wire and rubber to obtain a satisfactory result, I believe this may best be done by filling a sheet of the reinforcing material with rubber under pressure before cutting it into the strips or lengths for forming the tire; that is in the manner set forth in the application of Alfred Edmund Wale which has been serially numbered 607772.

It should be understood that to obtain the best effect from the invention using interwoven helical wire material spring steel wire should be employed.

In my invention the angle of inclination of the helices may be suited to the particular requirements in use and can readily be varied by varying the inclination of the strips themselves when mounting them in a tire or tire cover.

What I claim then is:

A tread for a tire or tire cover comprising a body of flexible resilient material with metallic reinforcement therein, said metallic reinforcement comprising strips of interlaced wire helices, said helices being flexible laterally and compressible axially, said strips being arranged in two circumferential series, and the strips in each series being arranged edgewise and side by side in parallel relation, the strips in one series being inclined upwardly and inwardly toward the central plane of the tread and the strips in the other series also being inclined upwardly and inwardly toward the central plane of the tread but in the opposite direction from the strips of the first series.

In testimony whereof I affix my signature in presence of two witnesses.

ALFRED WILLIAM TORKINGTON.

Witnesses:
    H. LARCHIN,
    CLARENCE E. DOWELL.